United States Patent
Xie et al.

(10) Patent No.: US 7,642,762 B2
(45) Date of Patent: Jan. 5, 2010

(54) CURRENT SOURCE WITH INDIRECT LOAD CURRENT SIGNAL EXTRACTION

(75) Inventors: Manjing Xie, Santa Clara, CA (US); Jindong Zhang, Fremont, CA (US)

(73) Assignee: Linear Technology Corporation, Milpitas, CA (US)

( * ) Notice: Subject to any disclaimer, the term of this patent is extended or adjusted under 35 U.S.C. 154(b) by 285 days.

(21) Appl. No.: 11/698,874

(22) Filed: Jan. 29, 2007

(65) Prior Publication Data
US 2008/0180075 A1 Jul. 31, 2008

(51) Int. Cl.
*G05F 1/575* (2006.01)
*G05F 1/618* (2006.01)
(52) U.S. Cl. ........................ 323/282; 315/224; 315/291
(58) Field of Classification Search ................. 323/282, 323/284, 285, 351; 315/209 R, 224, 225, 315/291
See application file for complete search history.

(56) References Cited

U.S. PATENT DOCUMENTS

| | | | | |
|---|---|---|---|---|
| 5,917,312 A | * | 6/1999 | Brkovic | 323/282 |
| 6,249,447 B1 | * | 6/2001 | Boylan et al. | 363/97 |
| 7,268,527 B2 | * | 9/2007 | Horner | 323/285 |
| 7,301,288 B2 | * | 11/2007 | Green | 315/291 |
| 7,315,153 B2 | * | 1/2008 | Tazawa et al. | 323/272 |
| 7,436,189 B2 | * | 10/2008 | Pai et al. | 324/713 |
| 7,508,182 B1 | * | 3/2009 | Chang | 323/282 |
| 2007/0001625 A1 | | 1/2007 | Kim | |

FOREIGN PATENT DOCUMENTS

DE 41 36 809 A1 5/1992
WO WO 2004/100614 A1 11/2004

OTHER PUBLICATIONS

International Search Report and Written Opinion of the International Searching Authority, issued in International Patent Application No. PCT/US2007/022742, mailed May 6, 2008.

* cited by examiner

*Primary Examiner*—Gary L Laxton
(74) *Attorney, Agent, or Firm*—McDermott Will & Emery LLP (57) ABSTRACT

A switching circuit for supplying current to a load has a switching element, an inductive element coupled to the switching element, and a load current extraction circuit responsive to current in the inductive element for producing a load current signal as a simulated current approximating current in the load.

20 Claims, 7 Drawing Sheets

FIG. 1
(BACKGROUND)

FIG. 2
(BACKGROUND)

FIG. 3A
(BACKGROUND)

FIG. 3B
(BACKGROUND)

CURRENT SOURCE WITH INDIRECT LOAD CURRENT SIGNAL EXTRACTION

TECHNICAL FIELD

The subject matter of this disclosure relates to power supply circuits, and more particularly to circuitry and methodology for indirect load current sensing in a switching circuit.

BACKGROUND

Some power supply circuits, such as light emitting diode (LED) drivers and laser diode drivers, require a current source with high output current. To achieve high efficiency, minimize device size and thermal stress, switching mode DC/DC converters may be utilized to provide a current source, especially in high current applications.

Figure 1:
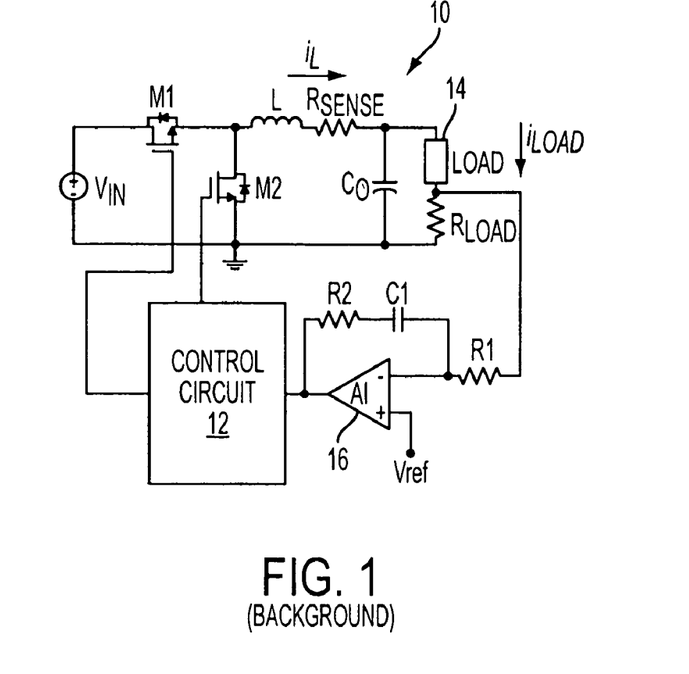
FIG. 1 illustrates a conventional direct load current sensing method for a switching regulator.

FIG. 1 illustrates a conventional DC/DC converter 10 that may be used as a power supply for providing current to a load, such as a LED or laser diode. The converter 10 may be a synchronous step-down switching regulator including a pair of MOSFETs M1 and M2 controllable by a control circuit 12 to produce a required value of current $i_{Load}$ in a load 14, such as a LED. The control circuit 12 may include a pulse width modulation (PWM) circuit for producing a PWM control signal, and switching logic driven by the PWM control signal to control switching of the MOSFETs M1 and M2.

When the MOSFET M1 is on, input voltage Vin is applied to inductor L coupled between the MOSFETs and the load 14. The difference between the input and output voltages across the inductor L causes inductor current $i_L$ flowing through the inductor L to increase. When the MOSFET M1 is turned off, the input voltage applied to the inductor L is removed. However, since the current in the inductor L does not change instantly, the voltage across the inductor L adjusts to maintain the inductor current. Hence, the inductor current ramps up when the M1 is on and ramps down when the M1 is off. When the MOSFET M2 is on, the inductor current flows from the inductor L to the load 14 and back through the M2. Resistor $R_{SENSE}$ is the inductor current sensing resistor required by the control circuit for loop compensation and over current protection. Output capacitor Co is connected in parallel to the load 14 to bypass the inductor ripple current. Because of this capacitor, the inductor current $i_L$ differs from the load current $i_{Load}$. Output capacitor Co is connected in parallel to the load 14 to reduce the inductor ripple current.

Load current $i_{Load}$ flowing through the load 14 may be directly sensed using load current sensing resistor $R_{Load}$ coupled in series with the load 14. An error amplifier 16 may compare the sense voltage representing the sensed load current $i_{Load}$ with a reference voltage Vref representing a desired current value to produce an error signal supplied to a compensation input of the control circuit 12. The error amplifier 16 may include an operational amplifier A1 having a non-inverting input supplied with the reference voltage Vref and an inverting input connected via resistor R1 to a node between the load 14 and the load current sensing resistor $R_{Load}$. An RC circuit composed of capacitor C1 and resistor R2 may be coupled between the inverting input and the output of the operational amplifier A1. In response to an error signal at the output of the error amplifier 16, the control circuit 12 controls switching of MOSFETs M1 and M2 to produce a desired value of load current.

However, the load resistor $R_{Load}$ used for sensing the load current causes significant power loss. Moreover, for high current applications, this current control method not only reduces power conversion efficiency but also increases the supply thermal stress.

Figure 2:
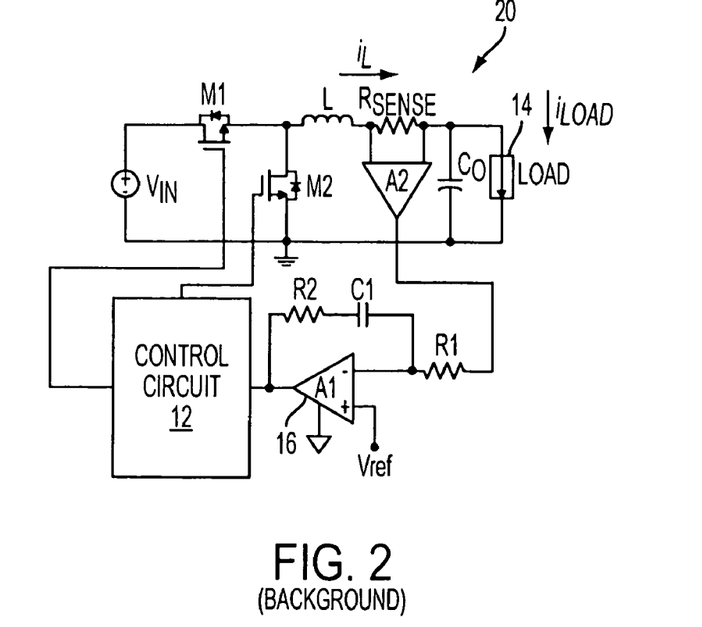
FIG. 2 illustrates a conventional inductor current sensing method for a switching regulator.

Another conventional current control method illustrated in FIG. 2 uses sensing of the inductor current $i_L$ to control the load current. A step-down converter 20 comprises MOSFETS M1 and M2, inductor L and output capacitor Co connected in the same manner as in the converter in FIG. 1. To avoid using the load resistor $R_{Load}$ and reduce power loss, the converter 20 includes a current sensing circuit that senses the inductor current $i_L$. The current sensing circuit may include a differential amplifier A2 having its inputs connected across terminals of sense resistor Rsense coupled in series with the inductor L. The output signal of the differential amplifier A2 is supplied to the error amplifier 16 for comparison with the reference voltage Vref. The error signal produced by the error amplifier 16 is supplied to the control circuit 12 to control switching of the MOSFETs.

However, the control circuit 12 does not directly control the load current $i_{Load}$. Instead, the inductor current is controlled. Therefore, the dynamic tracking performance of the converter 20 is compromised. For applications that require a fast load current transient response, such as LED true color dimming control, sensing of the inductor current results in poor load dynamic performance.

Figure 3A:
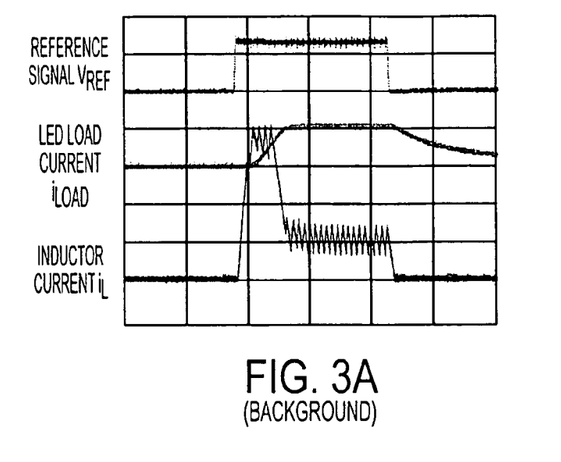
FIGS. 3a and 3b respectively show waveforms illustrating the conventional direct load current sensing method and the conventional inductor current sensing method.
Figure 3B:
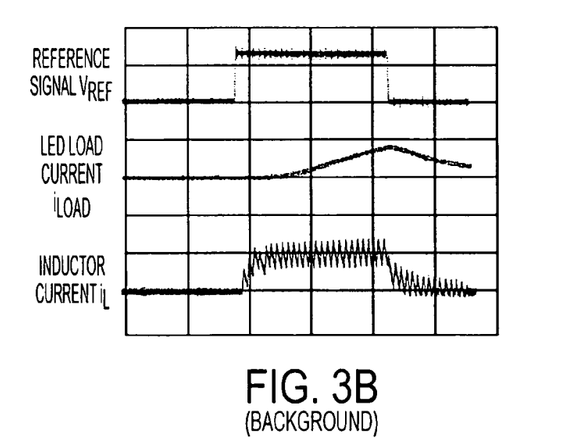

FIGS. 3a and 3b illustrate waveforms of various signals in circuits shown in FIGS. 1 and 2, respectively. In particular, FIGS. 3a and 3b show respective waveforms of reference signal Vref, load current $i_{Load}$ in a LED load and inductor current $i_L$. Ideally, the load current $i_{Load}$ should accurately follow the reference signal Vref. Due to the control loop delay, the rising and falling edges of the load current pulse are delayed with respect to the corresponding edges of the reference signal. The direct load current sensing illustrated in FIG. 1 provides acceptable waveform of the load current $i_{Load}$. However, the waveform of the load current $i_{Load}$ controlled using the inductor current sensing method in FIG. 2 is not acceptable because the inductor current $i_L$, instead of the load current $i_{Load}$, is used to track the reference signal Vref. Therefore, the current control scheme illustrated in FIG. 2 is much slower than the current control scheme in FIG. 1, and cannot be used for applications requiring a fast dynamic response.

Hence, there is a need for a current sensing scheme that would enable the current control system to improve its dynamic performance compared to a conventional control system with inductor current sensing, such as shown in FIG. 2, and would not have power loss disadvantages of a direct load current sensing scheme.

SUMMARY OF THE DISCLOSURE

In accordance with one aspect of the disclosure, a switching circuit for supplying an output current to a load comprises a switching element, an inductive element coupled to the switching element, and a load current extraction circuit responsive to current in the inductive element for producing a load current signal as a simulated current approximating current in the load. For example, the switching element and the inductive element may be connected in a step-down switching regulator configuration.

The load current extraction circuit may be configured to have a characteristic similar to a respective characteristic of output circuitry of the switching circuit. In particular, the load current extraction circuit may have a dynamic response similar to a dynamic response of the output circuitry when the output current supplied to the load is controlled.

In accordance with an embodiment of the disclosure, the switching circuit may further include an output capacitor coupled to the inductive element. The load may include a light-emitting diode (LED). The load current extraction circuit may be configured to have a transfer function similar to a transfer function of a low-pass filter formed by the output capacitor and the load, such as a LED. A frequency response of the load current extraction circuit may be determined by capacitance of the output capacitor and dynamic resistance of the LED.

For example, the load current extraction circuit may include a differential amplifier, a first RC circuit coupled between an inverting input and an output of the differential amplifier, and a second RC circuit coupled between a non-inverting input of the differential amplifier and a power supply terminal. Each of the first and second RC circuits may have a resistive element and a capacitive element connected in parallel.

To sense current in the inductive element, inputs of the differential amplifier may be coupled across terminals of a sense resistor coupled in series with the inductive element. Alternatively, the current in the inductive element may be sensed using DC resistance of the inductive element.

In accordance with another aspect of the disclosure, a system for driving a LED, comprises a switching regulator for producing an output current supplied to the LED. The switching regulator includes an inductive element, an output capacitor, and a current sensing circuit responsive to a current in the inductive element to produce a load current signal for controlling the output current. The current sensing circuit processes the current in the inductive element so as to produce the load current signal as a simulated current approximating current in the LED.

The current sensing circuit may be configured to have a transfer function similar to a transfer function of a low-pass filter provided by the output capacitor and the LED. A frequency response of the current sensing circuit may be determined by capacitance of the output capacitor and dynamic resistance of the LED.

In accordance with a method of the disclosure, the following steps are carried out to control a switching circuit having an inductive element:

sensing current in the inductive element, and processing the sensed current to produce a load current signal as a simulated current approximating current in a load of the switching circuit.

The load current signal may be produced to control an output current supplied to the load, by simulating a dynamic response of output circuitry of the switching circuit when the output current is supplied to the load. For example, the load and a capacitor in the output circuitry may be presented as a low-pass filter.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using the example of a system for controlling output current of a step-down switching regulator for a LED driver. It will become apparent, however, that the concept of the disclosure is applicable to any circuitry that senses current in an inductive element of a switching circuit to control the output current of the switching circuit. For example, the indirect current sensing of the present disclosure also may be used to control other switching mode converters, such as boost, buck-boost, flyback, and forward converters.

Figure 4:
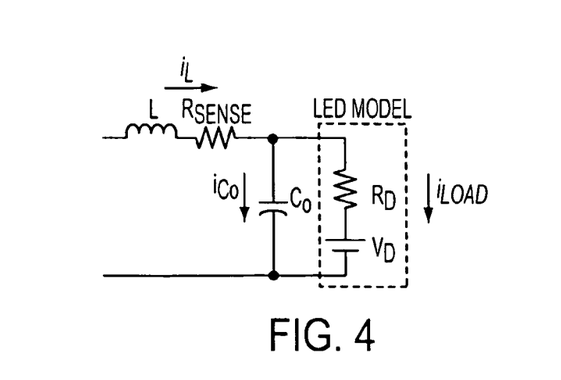
FIG. 4 illustrates an exemplary model of a load that can be utilized in accordance with the present disclosure.

In accordance with an exemplary embodiment of the present disclosure illustrated in FIG. 4, a load supplied by a current source may include a LED. A model of a LED may be represented by voltage source $V_D$ connected in series with resistor $R_D$ corresponding to the dynamic resistance of the LED. The current source illustrated in FIG. 4 may include inductor L, sense resistor Rsense and output capacitor Co connected in a step-down synchronous switching regulator configuration similar to the arrangement in FIG. 2. As discussed above, during operation of the switching regulator, inductor current $i_L$ flows in the inductor L creating load current $i_{Load}$ in the LED. The inductor current $i_L$ differs from the load current $i_{Load}$ because some of AC components $i_{Co}$ of the inductive current $i_L$ flow through the output capacitor Co.

An RC circuit formed by the LED dynamic resistance $R_D$ and the output capacitor Co may be considered as a low-pass filter. Therefore, in a conventional current control system with inductor current sensing illustrated in FIGS. 2 and 3b, the response of the load current $i_{Load}$ to a current control signal is much slower than the response of the inductor current $i_L$. The ratio between the load current $i_{Load}$ and the inductor current $i_L$ corresponds to a transfer function of a low-pass filter formed by the LED dynamic resistance $R_D$ and the output capacitor Co and may be presented as follows:

$$\frac{i_{Load}}{i_L} = \frac{1}{R_D \cdot C_O \cdot s + 1},$$

where $R_D$ is the dynamic resistance of LED,

Co is the capacitance of the output capacitor Co, and s is the Laplace variable.

To improve dynamic performance of a current control system with inductor current sensing, a circuit built based on the model of the low-pass filter formed by the LED dynamic resistance $R_D$ and the output capacitor Co is used to extract a load current signal from the sensed inductor current signal $i_L$. The extracted load current signal $i^*_{Load}$, which is a good approximation of the load current $i_{Load}$, is used as a control signal to control switching of a switching regulator so as to produce a required load current.

Figure 5:
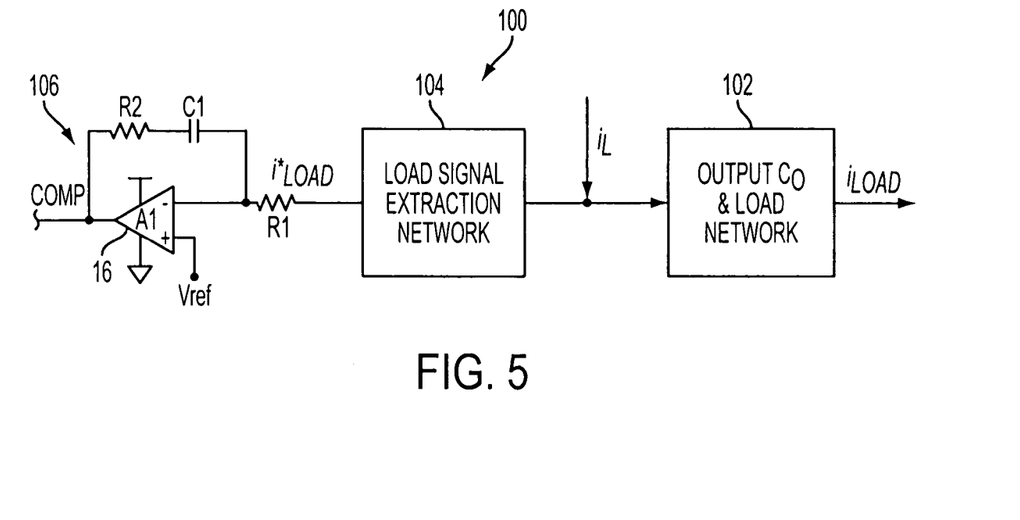
FIG. 5 shows a diagram illustrating a concept of the present disclosure.

As illustrated in FIG. 5, a current sensing mechanism 100 of the present disclosure takes into consideration an output network 102 that produces load current $i_{Load}$. For example, the output network 102 may be formed by the load and an output element of the switching regulator, such as output capacitor Co. Inductor current $i_L$ may be sensed using any known inductor current sensing method. For example, current $i_L$ flowing through inductor L may be sensed using sense resistor Rsense connected in series with the inductor L. The output capacitor Co, the inductor L and the sense resistor Rsense may be connected in a step-down synchronous switching regulator configuration similar to the arrangement in FIG. 2.

The sensed inductor current $i_L$ is supplied to a load signal extraction network 104 provided for extracting a load current signal $i^*_{Load}$ from the inductor current $i_L$ to produce a control signal for controlling the output current of the switching regulator. The load signal extraction network 104 is configured to have a characteristic similar to a respective characteristic of the output network 102 so as to approximate the load current $i_{Load}$ based on the sensed inductor current $i_L$. For example, the load current extraction network 104 may have a dynamic response similar to the dynamic response of the output network 102.

The extracted load current signal $i^*_{Load}$, that approximates the load current $i_{Load}$, may be supplied to an error amplifier 106 that may be similar to the error amplifier 16 shown in FIGS. 1 and 2. The error amplifier 106 may include an operational amplifier A1 having an inverting input connected to the output of the load signal extracting network 104 via resistor R1. A reference voltage Vref may be supplied to a non-inverting input of the operational amplifier A1. An RC circuit composed of capacitor C1 and resistor R2 may be provided between the inverting input and output of the operational amplifier A1. An error signal representing a difference between the extracted load current signal $i^*_{Load}$ and the reference signal Vref is produced at the output of the operational amplifier A1.

This error signal may be used to control switching in the switching regulator that produces the output current supplied to the load. As a result, the output current of the switching regulator is controlled based on the extracted load current signal $i^*_{Load}$. For example, the error signal may be supplied to the compensation input of a PWM control circuit similar to the control circuit 12 in FIGS. 1 and 2.

Figure 6:
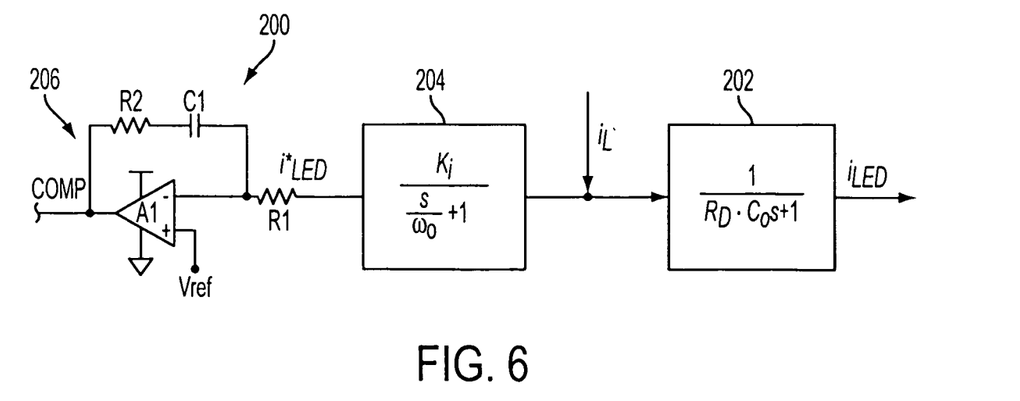
FIG. 6 shows a diagram illustrating an exemplary embodiment of the present disclosure.

FIG. 6 illustrates an exemplary current sensing mechanism 200 of the present disclosure configured to support output current control in a switching regulator of a LED driver for supplying current to a LED. An output network 202 is provided for supplying the LED current $i_{LED}$. The output network 202 may include output capacitor Co and the LED. As discussed above, the capacitance of the output capacitor Co and the dynamic resistance $R_D$ of the LED form a low-pass filter. Therefore, a dynamic response of the output network 202 may be modeled using the transfer function of the low-pass filter formed by the output capacitor Co and the dynamic resistance $R_D$ as follows:

$$\frac{i_{Load}}{i_L} = \frac{1}{R_D \cdot C_O \cdot s + 1}.$$

Current $i_L$ flowing through inductor L of the switching regulator may be sensed, for example, using sense resistor Rsense connected in series with the inductor L. The output capacitor Co, the inductor L and the sense resistor Rsense may be connected in a step-down synchronous switching regulator configuration similar to the arrangement in FIG. 2.

The sensed inductor current $i_L$ is supplied to a load signal extraction network 204 that may be modeled so as to implement a transfer function matching the transfer function of the output network as follows:

$$\left(\frac{i^*_{Load}}{i_L R_{SENSE}}\right) \frac{K_i}{\frac{s}{\omega_0} + 1},$$

where $K_i$ may represent the gain of a differential amplifier for sensing the inductor current $i_L$, $i^*_{Load}$ is an extracted load current signal that approximates the LED current, and $$\omega_0 = \frac{1}{R_D C_O}$$

is the cutoff frequency of the low-pass filter formed by the capacitor Co and the dynamic resistance $R_D$ of the LED.

Based on the sensed inductor current $i_L$, the load signal extraction network 204 produces the extracted load current signal $i^*_{LED}$ that approximates the LED current. The extracted load current signal $i^*_{LED}$ is supplied to an error amplifier 206 that compares this signal with a reference signal Vref to produce an error signal for controlling the switching regulator. The error amplifier 206 may be arranged in the same way as the error amplifier 16 in FIGS. 1 and 2. One skilled in the art of switching regulators would realize that the error amplifier 206 may compare voltage representing the extracted load current signal $i^*_{LED}$ with the reference voltage Vref. Alternatively, a current representing the extracted load current signal $i^*_{LED}$ may be compared with a current representing the reference voltage Vref.

Figure 7:
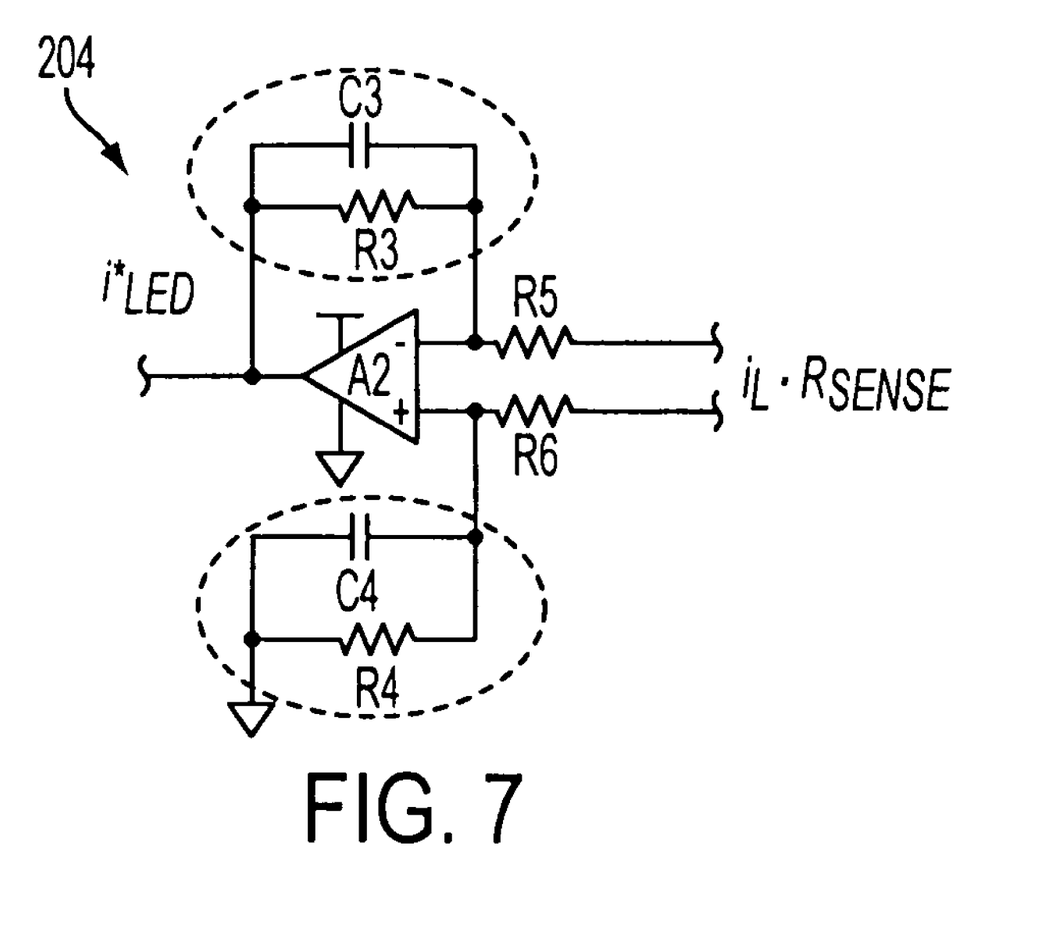
FIG. 7 shows exemplary circuit implementation of a load signal extraction network of the present disclosure.

FIG. 7 shows exemplary circuit implementation of the load current extraction network 204 that may include a differential amplifier A2 configured for sensing the inductor current $i_L$ and implementing the transfer function matching the transfer function of the output network 202 so as to approximate the LED current $i_{LED}$ based on the inductor current $i_L$. For example, inputs of the amplifier A2 may be connected across terminals of the sense resistor Rsense coupled in series with the inductor L.

A first RC circuit composed of resistor R3 and capacitor C3 connected in parallel may be coupled between the inverting input of the amplifier A2 and its output. A second RC circuit composed of resistors R4 and C4 coupled in parallel may be connected between the non-inverting input of the amplifier A2 and a power supply terminal. The resistance and capacitance values of the RC circuits are selected to provide a transfer function matching the transfer function of the low-pass filter formed by the output capacitor Co and the dynamic resistance of the LED. For example, 100 kΩ resistors may be used as resistors R3 and R4, and 47 pF capacitors may be used as capacitors C1 and C2. Power supply voltage may be equal to 1.5V. Resistors R5 and R6 may be connected between the inputs of the amplifier A2 and respective terminals of the sense resistor Rsense. For example, 10 kΩ resistors may be used as resistors R1 and R2. The extracted load current signal $i^*_{LED}$ that approximates the LED current $i_{LED}$ is produced at the output of the amplifier A2.

Figure 8:
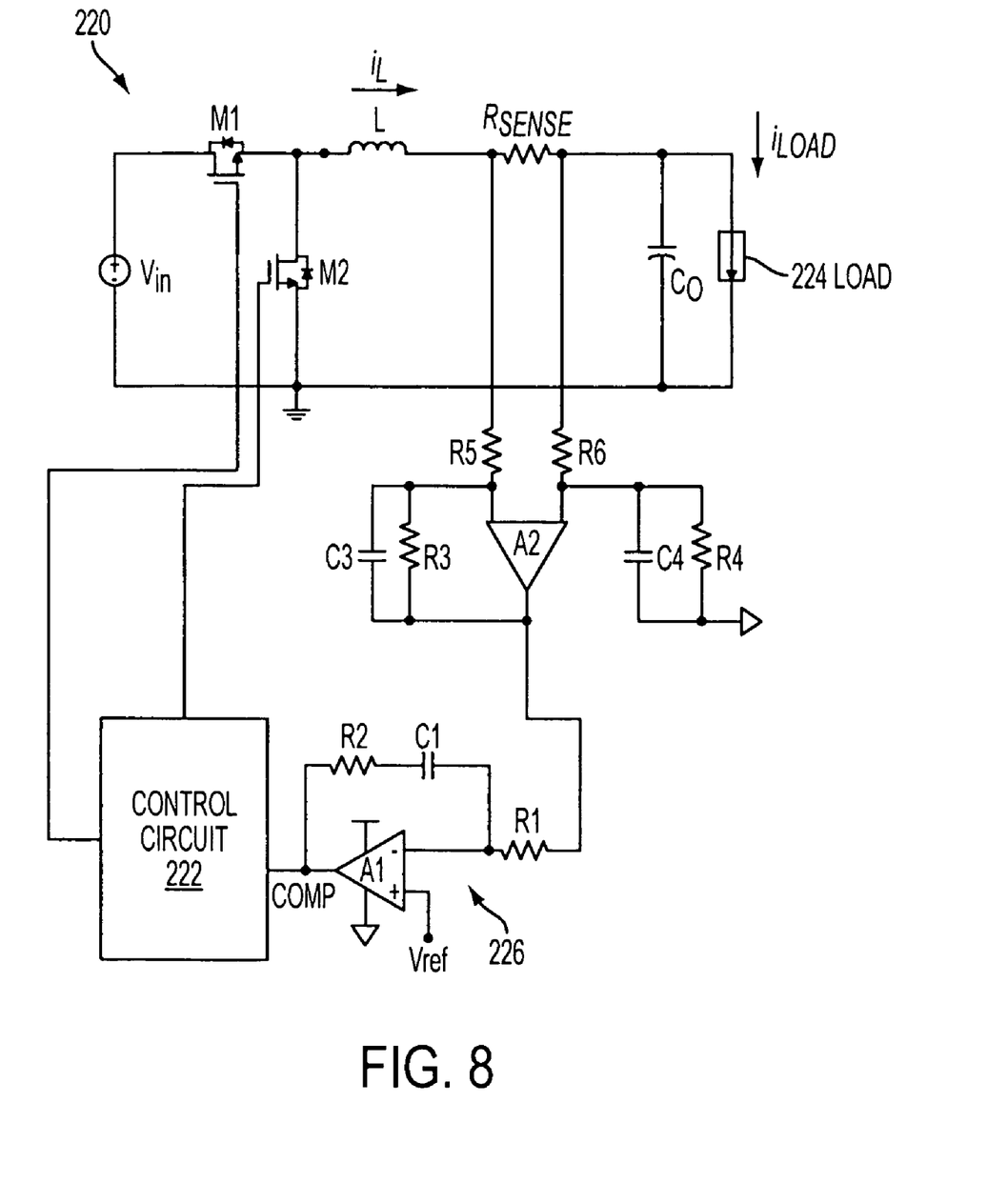
FIG. 8 illustrates a circuit arrangement in accordance with a first exemplary embodiment of the present disclosure.

FIG. 8 illustrates an exemplary step-down DC/DC converter 220 of the present disclosure that incorporates the current sensing mechanism discussed in connection with FIGS. 5-7. The converter 220 may include a pair of MOSFETs M1 and M2 controllable by a PWM control circuit 222 to produce a required value of current $i_{Load}$ in a load 224. The control circuit 222 is controlled by an error amplifier 226 including an operational amplifier A1, resistor R1 coupled to the inverting input of the amplifier A1 and an RC circuit composed by resistor R2 and capacitor C1 connected between the inverting input and the output of the amplifier A1.

Further, the converter 220 has a current sensing mechanism including a differential amplifier A2 connected across terminals of the sense resistor Rsense coupled in series with the inductor L. The RC circuit composed of resistor R3 and capacitor C3 connected in parallel may be coupled between the inverting input of the amplifier A2 and its output. The RC circuit composed of resistors R4 and C4 coupled in parallel may be connected between the non-inverting input of the amplifier A2 and a power supply terminal. The resistance and capacitance values of the RC circuits are selected to provide a transfer function matching the transfer function of the low-pass filter formed by the output capacitor Co and the dynamic resistance of the LED load 224. Resistors R5 and R6 are connected between the inputs of the amplifier A2 and respective terminals of the sense resistor Rsense.

Hence, the current sensing mechanism of the converter 220 senses the inductor current $i_L$ and implements the transfer function matching the transfer function of the output network so as to approximate the LED load current $i_{Load}$ based on the inductor current $i_L$.

Figure 9A:
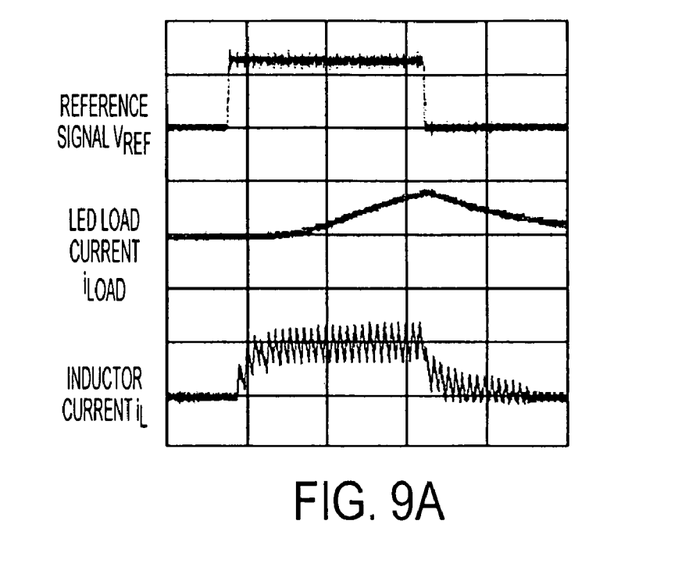
FIGS. 9a and 9b respectively show waveforms illustrating the conventional inductor current sensing method and the current sensing method of the present disclosure.
Figure 9B:
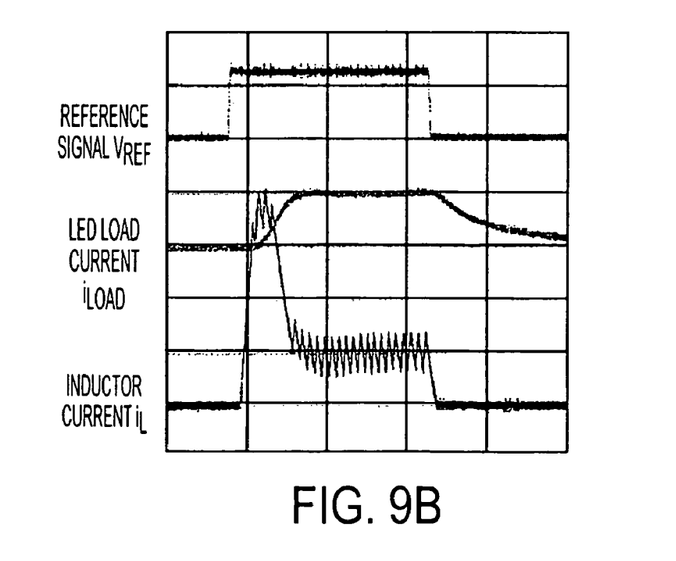

FIGS. 9a and 9b respectively present waveforms illustrating inductive current sensing method without load current signal extraction and the current sensing method with load current signal extraction of the present disclosure. In particular, FIGS. 9a and 9b show respective waveforms of reference signal Vref, LED load current $i_{Load}$ and inductor current $i_L$. As shown in FIG. 9b, the load current signal extraction mechanism of the present disclosure enables the switching regulator to substantially improve its dynamic performance. The LED current provided using the current sensing mechanism of the present disclosure follows the reference signal Vref much faster than the LED current produced using a conventional inductor current sensing method.

Figure 10:
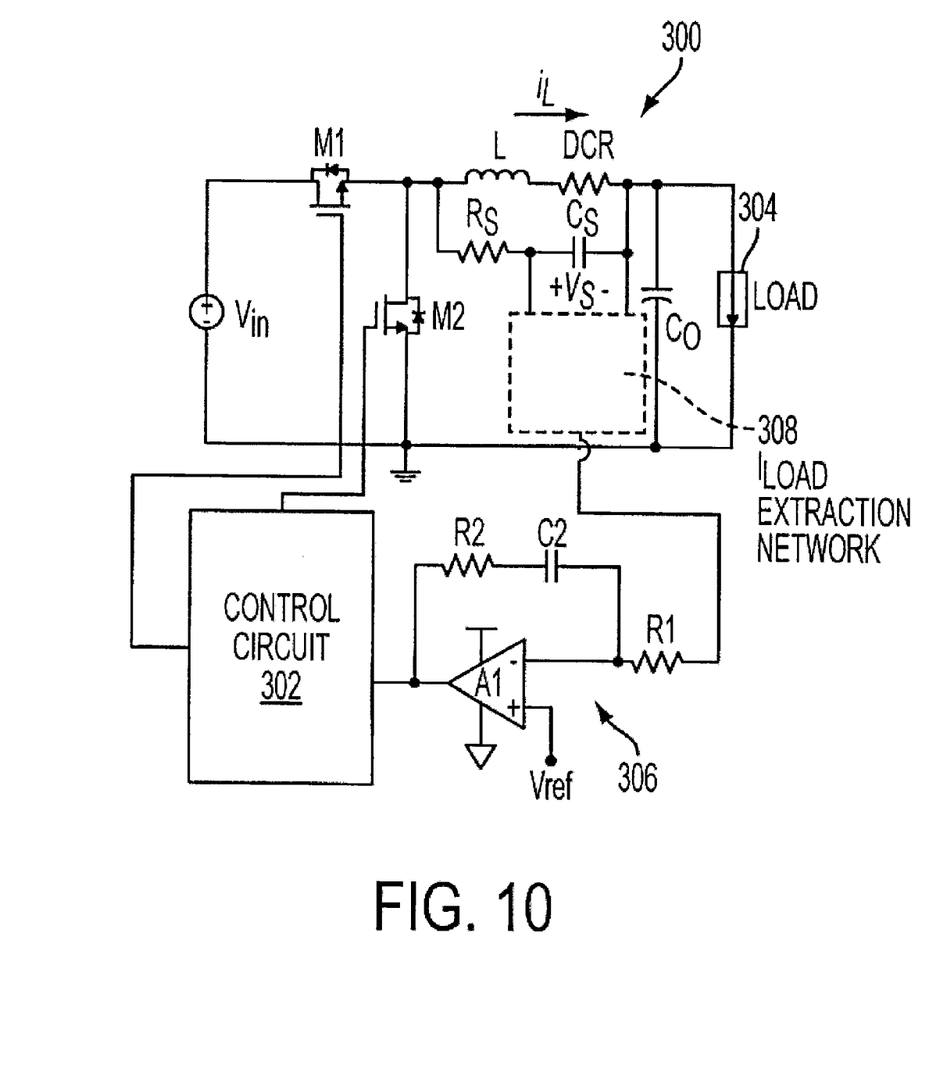
FIG. 10 illustrates a second exemplary embodiment of the present disclosure.

The load current signal extraction mechanism of the present disclosure may be implemented using any inductor current sensing methodology. For example, FIG. 10 illustrates the load current signal extraction mechanism of the present disclosure in an exemplary switching regulator using an inductor DCR current sensing scheme. A synchronous buck converter 300 in FIG. 10 may include a pair of MOSFETs M1 and M2 controllable by a PWM control circuit 302 to produce a required value of current $i_{Load}$ in a load 304. The control circuit 302 is controlled by an error amplifier 306 including an operational amplifier A1, resistor R1 coupled to the inverting input of the amplifier A1 and an RC circuit composed by resistor R2 and capacitor C1 connected between the inverting input and the output of the amplifier A1.

The converter 300 also includes an inductor represented by its inductance L and parasitic direct current resistance DCR. An RC circuit composed of series resistor Rs and capacitor Cs is connected across the inductor. The time constant of the RC circuit is matched with the time constant of the RL circuit formed by the inductance L and the DCR. The output capacitor Co is connected in parallel to the load 304 to reduce ripple inductor current.

To sense the inductor current $i_L$, a load current signal extraction network 308 of the present disclosure may be connected to determine voltage Vs across the capacitor Cs. If the load 304 is a LED, the load current extraction network 308 may have an arrangement shown in FIG. 7. The inputs of the differential amplifier A2 may be connected across the capacitor Cs to sense the inductor current $i_L$. To approximate the load current based on the inductor current $i_L$, the first and second parallel RC circuits coupled to the amplifier A2 may be selected to match the transfer function of the low-pass filter formed by the dynamic resistance of the LED and the capacitor Co. The extracted load current signal $i^*_{LED}$ approximating the load current may be supplied from the output of the differential amplifier A2 to the inverting input of the amplifier A1 that compares it with a reference signal Vref to produce an error signal applied to the PWM control circuit 302 for controlling the load current.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention.

Accordingly, the description is not intended to limit the invention to the form disclosed herein. Also, it is intended that the appended claims be construed to include alternative embodiments.

What is claimed is:

1. A switching circuit for supplying an output current to a load, comprising:
    a switching element,
    an inductive element coupled to the switching element to deliver current to the load,
    a capacitive element between the inductive element and the load, current in the load being different from current in the inductive element due to a current component flowing through the capacitive element, and
    a load current extraction circuit responsive to current in the inductive element for producing a load current signal representing the current in the load, the load current signal being produced as a simulated current approximating the current in the load so as to take into account influence of the capacitive element on the current in the load.

2. The circuit of claim 1, wherein the load current extraction circuit is configured to have a characteristic similar to a respective characteristic of output circuitry of the switching circuit.

3. The circuit of claim 2, wherein the load current extraction circuit is configured to a have a dynamic response similar to a dynamic response of the output circuitry when the output current supplied to the load is controlled.

4. The circuit of claim 1, further including an output capacitor coupled to the inductive element.

5. The circuit of claim 4, wherein the load includes a light-emitting diode (LED).

6. The circuit of claim 5, wherein the load current extraction circuit is configured to have a transfer function that matches a transfer function of a low-pass filter formed by the output capacitor and the LED.

7. The circuit of claim 6, wherein the load current extraction circuit includes a differential amplifier.

8. The circuit of claim 1, wherein the switching element and the inductive element are connected in a step-down switching regulator configuration.

9. The circuit of claim 1, wherein the current in the inductive element is sensed using a sense resistor coupled in series with the inductive element.

10. The circuit of claim 1, wherein the current in the inductive element is sensed using DC resistance of the inductive element.

11. A switching circuit for supplying an output current to a load, comprising:
a switching element,
an inductive element coupled to the switching element
an output capacitor coupled to the inductive element, and
a load current extraction circuit responsive to current in the inductive element for producing a load current signal as a simulated current approximating current in the load,
wherein the load includes a light-emitting diode (LED),
the load current extraction circuit is configured to have a transfer function that matches a transfer function of a low-pass filter formed by the output capacitor and the LED, and to have a frequency response determined by capacitance of the output capacitor and dynamic resistance of the LED.

12. A switching circuit for supplying an output current to a load, comprising:
a switching element,
an inductive element coupled to the switching element
an output capacitor coupled to the inductive element, and
a load current extraction circuit responsive to current in the inductive element for producing a load current signal as a simulated current approximating current in the load,
wherein the load includes a light-emitting diode (LED),
the load current extraction circuit is configured to have a transfer function that matches a transfer function of a low-pass filter formed by the output capacitor and the LED, and
the load current extraction circuit includes a differential amplifier, a first RC circuit coupled between an inverting input and an output of the differential amplifier, and a second RC circuit coupled between a non-inverting input of the differential amplifier and a power supply terminal.

13. The circuit of claim 12, wherein each of the first and second RC circuits includes a resistive element and a capacitive element connected in parallel.

14. A system for driving a LED, comprising:
a switching regulator for producing an output current supplied to the LED, the switching regulator including an inductive element and an output capacitor, current in the LED being different from current in the inductor due to a current component flowing through the output capacitor, and
a current sensing circuit responsive to current in the inductive element to produce a load current signal for controlling the output current, the current sensing circuit is configured to process the current in the inductive element so as to produce the load current signal as a simulated current approximating the current in the LED so as to take into account influence of the output capacitor on the current in the LED.

15. The system of claim 14, wherein the current sensing circuit is configured to have a transfer function that matches a transfer function of a low-pass filter provided by the output capacitor and the LED.

16. A system for driving a LED, comprising:
a switching regulator for producing an output current supplied to the LED, the switching regulator including an inductive element and an output capacitor, and
a current sensing circuit responsive to current in the inductive element to produce a load current signal for controlling the output current, the current sensing circuit is configured to process the current in the inductive element so as to produce the load current signal as a simulated current approximating current in the LED,
wherein the current sensing circuit is configured to have a frequency response determined by capacitance of the output capacitor and dynamic resistance of the LED.

17. A method of controlling a switching circuit having an inductive element, a load, and a capacitive element between the inductive element and the load, the method comprising the steps of:
sensing current in the inductive element, current in the load being different from current in the inductor due to a current component flowing through the capacitive element, and
processing the sensed current so as to produce a load current signal as a simulated current approximating the current in the load so as to take into account influence of the capacitive element on the current in the load.

18. The method of claim 17, wherein the load current signal is produced to control an output current of the switching circuit.

19. The method of claim 18, wherein the load current signal is produced by simulating a dynamic response of output circuitry of the switching circuit when the output current is supplied to the load.

20. A method of controlling a switching circuit having an inductive element, the method comprising the steps of:
sensing current in the inductive element, and
processing the sensed current so as to produce a load current signal as a simulated current approximating current in a load of the switching circuit,
wherein the load current signal is produced to control an output current of the switching circuit, by simulating a dynamic response of output circuitry of the switching circuit when the output current is supplied to the load, based on a mathematical model of a low-pass filter provided by the load and a capacitor in the output circuitry.

* * * * *